US009258040B2

(12) United States Patent
Levy

(10) Patent No.: US 9,258,040 B2
(45) Date of Patent: *Feb. 9, 2016

(54) CHANNEL SOUNDING FOR IMPROVED SYSTEM PERFORMANCE

(71) Applicant: INTERDIGITAL TECHNOLOGY CORPORATION, Wilmington, DE (US)

(72) Inventor: Joseph S. Levy, Merrick, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,543

(22) Filed: Sep. 19, 2014

(65) Prior Publication Data

US 2015/0030095 A1 Jan. 29, 2015

Related U.S. Application Data

(60) Continuation of application No. 13/960,071, filed on Aug. 6, 2013, now Pat. No. 8,917,583, which is a division of application No. 11/201,676, filed on Aug. 11, 2005, now Pat. No. 8,531,937.

(60) Provisional application No. 60/600,739, filed on Aug. 11, 2004.

(51) Int. Cl.
*H04W 72/04* (2009.01)
*H04B 7/04* (2006.01)
(Continued)

(52) U.S. Cl.
CPC ............ *H04B 7/0417* (2013.01); *H04B 7/0443* (2013.01); *H04B 7/0619* (2013.01);
(Continued)

(58) Field of Classification Search
CPC ... H04L 5/0007; H04L 27/2647; H04L 47/10; H04B 7/04; H04W 84/12

USPC ................ 370/203, 208, 338, 465, 329, 328; 375/267, 200, 205
See application file for complete search history.

(56) References Cited

U.S. PATENT DOCUMENTS 5,757,782 A 5/1998 Gaskill
6,031,831 A * 2/2000 Tan Boon et al. ............. 370/342
(Continued)

FOREIGN PATENT DOCUMENTS

JP 2003-101504 4/2003
JP 2003-143651 5/2003
(Continued)

OTHER PUBLICATIONS

"Correction to signalling of reference power offset", Siemens, Change Request; 3GPP TSG-RAN WG2 Meeting 51, Denver, U.S., Tdoc R2-060668, Feb. 13-17, 2006, 5 pages.
(Continued)

*Primary Examiner* — Jamal Javaid
(74) *Attorney, Agent, or Firm* — Theodore Naccarella

(57) ABSTRACT

A transmitter generates and transmits a low rate signal to its intended receiver. Upon receiving the low rate signal, the intended receiver generates and transmits a channel sounding response (CSR), said CSR being a short burst having a predefined transmit format and carrying predetermined information. The transmitter then analyzes the CSR and determines uplink channel response, estimates downlink channel response, and determines appropriate transmit parameter settings based on the analysis and downlink response estimate. Adjustment of the transmit parameters can be made in either the MAC or PHY layer or in a combination of both. After adjusting its transmit parameters and modulating sub-carriers with user-data according to the determined transmit settings, the transmitter transmits the user-data to the receiver on a preferred portion of bandwidth. In a preferred embodiment, the transmitter also generates and transmits a transmit format control (TFC) signal containing the determined transmit parameter settings, including sub-carrier modulation information, to the receiver.

20 Claims, 3 Drawing Sheets

(51) Int. Cl.

| | | |
|---|---|---|
| *H04B 7/06* | (2006.01) | |
| *H04L 1/00* | (2006.01) | |
| *H04L 27/26* | (2006.01) | |
| *H04W 52/42* | (2009.01) | |
| *H04L 5/00* | (2006.01) | |
| *H04B 7/02* | (2006.01) | |

(52) U.S. Cl.
CPC ............ *H04B 7/0626* (2013.01); *H04L 1/0001* (2013.01); *H04L 1/0003* (2013.01); *H04L 1/0026* (2013.01); *H04L 5/0044* (2013.01); *H04L 27/2608* (2013.01); *H04W 52/42* (2013.01); *H04B 7/02* (2013.01); *H04B 7/0421* (2013.01)

(56) References Cited

U.S. PATENT DOCUMENTS

| | | | |
|---|---|---|---|
| 6,862,440 B2* | 3/2005 | Sampath | 455/276.1 |
| 6,870,824 B1* | 3/2005 | Kim et al. | 370/342 |
| 2002/0102940 A1 | 8/2002 | Bohnke et al. | |
| 2002/0159414 A1 | 10/2002 | Kanemoto et al. | |
| 2002/0181390 A1 | 12/2002 | Mody et al. | |
| 2003/0103521 A1 | 6/2003 | Raphaeli et al. | |
| 2003/0172153 A1 | 9/2003 | Vaver | |
| 2003/0193889 A1 | 10/2003 | Jacobsen | |
| 2005/0180361 A1 | 8/2005 | Hansen et al. | |

FOREIGN PATENT DOCUMENTS

| | | |
|---|---|---|
| JP | 2004-080110 | 3/2004 |
| JP | 2004-180313 | 6/2004 |
| JP | 2004-523934 | 8/2004 |
| WO | WO-02/31991 | 4/2002 |
| WO | WO-02/078211 A2 | 10/2002 |
| WO | WO-02/103943 | 12/2002 |
| WO | WO-03/058871 A1 | 7/2003 |
| WO | WO-03/073646 A1 | 9/2003 |
| WO | WO-2004/021634 A1 | 3/2004 |
| WO | WO-2004/054191 | 6/2004 |

OTHER PUBLICATIONS

"Digital cellular telecommunications system (Phase 2+); Universal Mobile Telecommunications System (UMTS); Mobile radio interface Layer 3 specification; Core network protocols; Stage 3", ETSI TS 124 008 7.6.0 (3GPP TS 24.008 version 7.6.0 Release 7), Dec. 2006, 540 pages.
"Draft IEEE Standard for Local and metropolitan area networks, Part 16: Air Interface for Fixed and Mobile Broadband Wireless Access Systems", IEEE P802.16e/D4, Aug. 2, 2004, 270 pages.
"Draft IEEE Standard for Local and metropolitan area networks, Part 16: Air Interface for Fixed and Mobile Broadband Wireless Access Systems", IEEE P802.16e/D10, Aug. 9, 2005, 679 pages.
"IEEE Standard for Local and metropolitan area networks, Part 16: Air Interface for Fixed and Mobile Broadband Wireless Access Systems", IEEE Std 802.16-2004, Oct. 1, 2004, 892 pages.
"International Search Report and Written Opinion", International Application No. PCT/US2005/28122, Dec. 15, 2005, 5 pages.
"Japanese Official Notice of Rejection", Japanese Patent Application No. 2010-172781, Aug. 17, 2012, 2 pages.
"Japanese Official Notice of Rejection", Japanese Patent Application No. 2007-525703, Jun. 12, 2012, 2 pages.
"Japanese Official Notice of Rejection (English Translation)", Japanese Patent Application No. 2007-525703, Jun. 12, 2012, 2 pages.
"Japanese Official Notice of Rejection (English Translation)", Japanese Patent Application No. 2010-172781, Aug. 17, 2012, 3 pages.
"Korean Office Action", Korean Patent Application No. 10-2005-0074009, Dec. 12, 2011, 5 pages.
"Korean Office Action (English Translation)", Korean Patent Application No. 10-2005-0074009, Dec. 12, 2011, 5 pages.
"Mobile radio interface layer 3 specification; Core Network Protocols; Stage 3", 3GPP TS 24.008 V3.20.0, Dec. 2005, 450 pages.
"Unapproved Draft IEEE Standard for Local and metropolitan area networks Corrigendum to IEEE Standard for Local and Metropolitan Area Networks—Part 16: Air Interface for Fixed Broadband Wireless Access Systems", IEEE Std P802.16/REVd/D5 (Revision of IEEE Std 802.16-2001; IEEE Std 802.16c-2002, and IEEE std 802.16a-2003), Not yet able to obtain a .PDF copy http://ieeexplore.ieee.org/stamp/stamp.jsp?tp=&arnumber=4039724&isnumber=4039723, May 2004, 915 pages.
Prabhu, R. S., et al., "An Energy-Efficient Water-Filling Algorithm for OFDM Systems", 2010 IEEE International Conference on Communications (ICC), May 23-27, 2010, 5 pages.

* cited by examiner

CHANNEL SOUNDING FOR IMPROVED SYSTEM PERFORMANCE

CROSS REFERENCE TO RELATED APPLICATIONS

This application is a Continuation application of U.S. application Ser. No. 13/960,071 filed Aug. 6, 2013; which is a division of U.S. application Ser. No. 11/201,676, now U.S. Pat. No. 8,531,937; and claims the benefit of U.S. Provisional Application No. 60/600,739 filed Aug. 11, 2004, each of which are incorporated by reference as if fully set forth.

FIELD OF INVENTION

The present invention relates to wireless communication systems. More particularly, the present invention is a method and apparatus for improving channel and system performance in a wireless communication system.

BACKGROUND

Orthogonal Frequency Division Multiplexing (OFDM) refers to a data transmission scheme wherein user-data is split into smaller data streams and transmitted using sub-carriers that each has a smaller bandwidth than the total available transmission bandwidth. The efficiency of OFDM results from the orthogonality of the sub-carriers. That is to say, the sub-carriers are selected such that they do not interfere with each other during transmission, thus resulting in an efficient transmission scheme.

Multiple-Input Multiple-Output (MIMO) refers to a wireless transmission and reception scheme wherein both transmitter(s) and receiver(s) employ multiple antennas for transmission and reception. A MIMO system takes advantage of the spatial diversity or spatial multiplexing options created by the presence of the multiple antennas to increase throughput.

A continuing challenge for OFDM-MIMO systems is system performance, i.e., capacity, reliability, etc. Towards this end, many techniques have been proposed for improving, for instance, channel capacity and/or reliability. An example of one such technique is referred to as "water-filling", another example is power control. Water-filling and power control describe processes whereby a transmitter estimates channel conditions using feedback signals from a receiver in the system. Based on these estimates, the transmitter attempts to transmit user data in a way that optimizes channel performance in view of the channel conditions. As with similar techniques, water-filling and power control rely upon knowledge of the transmission channel, via feedback signals, to optimize channel performance. The signaling overhead associated with these feedback signals, however, is significant and often limits any potential increase in system performance. In addition, generating and transmitting feedback signals causes delays which also limit potential increases in system performance. These drawbacks to feedback signaling are particularly evident in systems with rapidly changing channel conditions, systems transmitting large amounts of data, and/or systems utilizing a large number of sub-carriers.

Accordingly, it is desirable to have a method and apparatus for efficiently estimating current channel conditions for use in improving overall system performance in OFDM-MIMO systems.

SUMMARY

The present invention is a method and apparatus for improving system performance in Multiple-Input, Multiple-Output (MIMO) Orthogonal Frequency Division Multiplexing (OFDM) wireless communication systems. A transmitter generates and transmits a low rate signal to its intended receiver. Upon receiving the low rate signal, the intended receiver generates and transmits a channel sounding response (CSR), said CSR being a short burst having a predefined transmit format and carrying predetermined information. The transmitter then analyzes the CSR and determines uplink channel response, estimates downlink channel response, and determines appropriate transmit parameter settings based on the analysis and downlink response estimate. Adjustment of the transmit parameters can be made in either the MAC or PHY layer or in a combination of both. After adjusting its transmit parameters and modulating sub-carriers with user-data according to the determined transmit settings, the transmitter transmits the user-data to the receiver on a preferred portion of bandwidth. In a preferred embodiment, the transmitter also generates and transmits a transmit format control (TFC) signal containing the determined transmit parameter settings, including sub-carrier modulation information, to the receiver.

DETAILED DESCRIPTION OF THE PREFERRED EMBODIMENTS

Herein, a wireless transmit/receive unit (WTRU) includes but is not limited to a user equipment, mobile station, fixed or mobile subscriber unit, pager, or any other type of device capable of operating in a wireless environment. When referred to herein, a base station includes but is not limited to a Node-B, site controller, access point or any other type of interfacing device in a wireless environment.

In a preferred embodiment, channel sounding pulses are used for improving channel and system performance in Orthogonal Frequency Division Multiplexing (OFDM) systems utilizing Multiple-Input, Multiple-Output (MIMO) equipment. The sounding pulses enable MIMO-OFDM transmitters, for instance, to assess current channel conditions and hence, to format transmit data packets that optimize throughput in view of the channel conditions.

In accordance with the present embodiment, a MIMO-OFDM transmitter generates and transmits a low rate signal, such as a request for a sounding pulse (CSRq) to an intended receiver. Upon receiving this request, the receiver generates a channel sounding response (CSR) and transmits it to the requesting transmitter. This CSR is preferably a short burst formatted with predetermined transmit parameters that assure its successful reception given the particular system configuration and environment. Included in the CSR is information known to the transmitter. The transmitter, upon receiving the CSR, processes the information and determines current channel conditions. Based on these determinations, the transmitter modulates user data to sub-carriers and adjusts its transmit parameters to maximize channel capacity, reliability, and/or any other channel performance characteristic as required by a user, using any of the various channel optimization techniques including water-filling and power control. Utilizing CSR pulses to assess channel conditions, rather than conventional feedback signals, enables the transmitter to format and transmit data packets that optimize channel performance without incurring all of the overhead and delay of conventional channel-improvement approaches.

Figure 1:
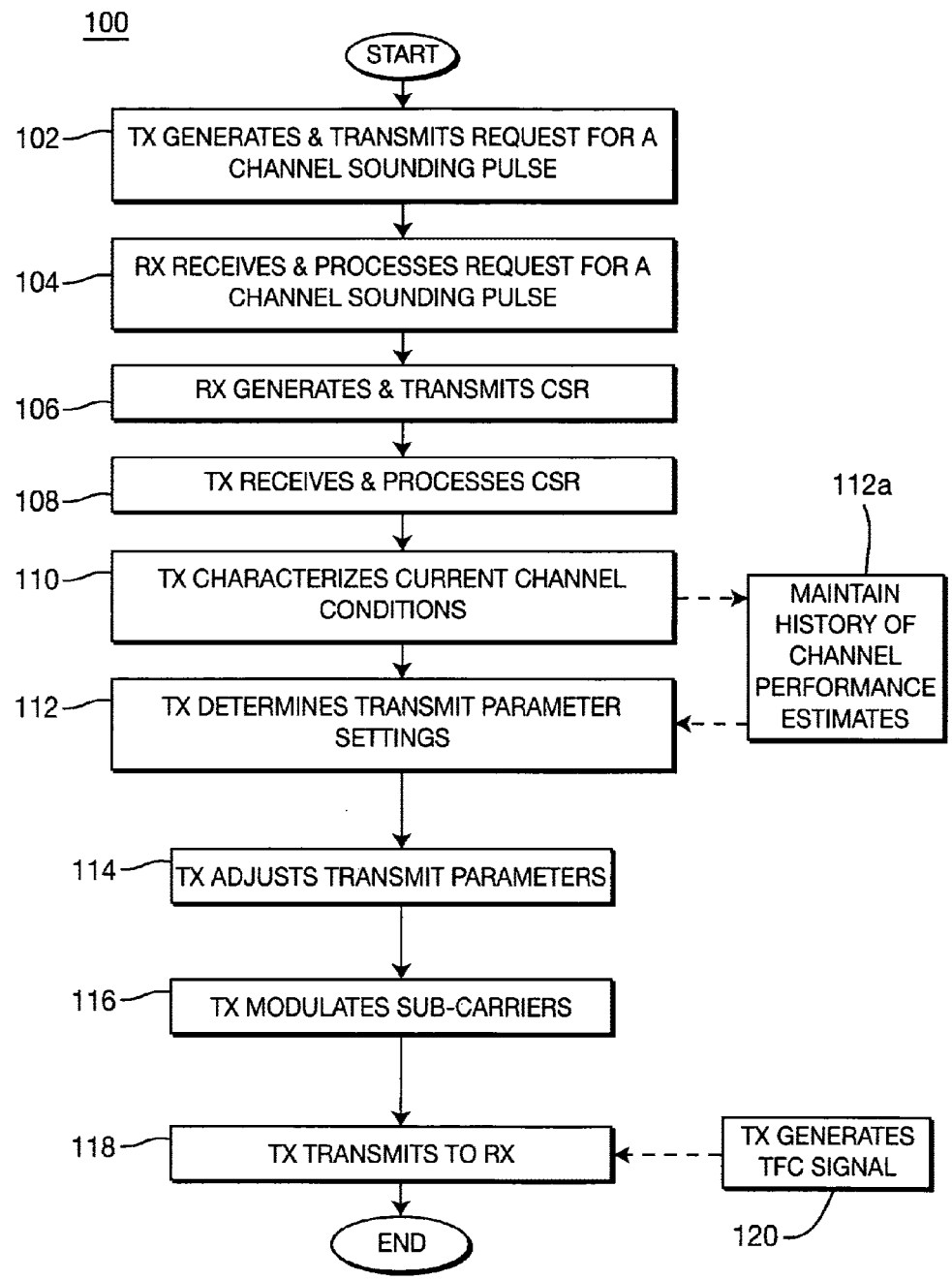
FIG. 1 is a flow diagram illustrating a channel sounding scheme for improving system performance in Multiple-Input, Multiple-Output (MIMO) Orthogonal Frequency Division Multiplexing (OFDM) communication systems.

Referring now to FIG. 1, a flow diagram 100 illustrating a channel sounding scheme for improving system performance in MIMO-OFDM wireless communication systems is shown. Prior to transmitting data, a transmitter generates a channel sounding response request in the form of a low rate signal and transmits it to a receiver (step 102). This request is preferably a low data rate signal, such as a data packet header, containing source (i.e., transmitter) and destination (i.e., intended receiver) information. Upon receiving and processing the low rate signal (step 104), the receiver generates and transmits a predefined channel sounding response (CSR) (step 106), preferably as a short burst or pulse, to the transmitter. The CSR is preferably predefined in terms of its size, number of symbols, amplitude, etc., to assure successful reception at the transmitter given the particular system configuration and/or the receiver's allocated resources. Included in the CSR is information the transmitter may use in assessing current channel conditions.

At the transmitter, the CSR is received and information transmitted as part of the CSR is processed (step 108) and utilized to characterize the current channel conditions (step 110). This characterization includes determining uplink channel response via measuring the amplitude, phase, and quality of each received sub-carrier at each antenna; and estimating downlink channel response. If a particular sub-carrier indicates a high error rate, for instance, the transmitter will not modulate that sub-carrier with large amounts of data. Conversely, if a particular sub-carrier arrives at the transmitter with a relatively low error rate, the transmitter will more heavily modulate that sub-carrier with user data.

Once the channel conditions are known in the uplink and estimated for the downlink (step 110), the transmitter determines appropriate transmit parameter settings (step 112), (e.g., antenna selection, antenna power, bandwidth selection, carrier power, carrier coding, carrier modulation, etc.), makes the appropriate parameter adjustments (step 114), and accordingly modulates its sub-carriers (step 116), preferably using a water-filling, power control, or similar technique. It should be noted that the parameter adjustments may occur in the MAC layer, in the PHY layer, or in a combination of the two. The formatted data packets are then transmitted on select portion of bandwidth to the receiver (step 118). Optionally, the transmitter tracks the channel performance estimates derived from current and previous CSR measurements (step 112*a*), enabling the transmitter to predict future channel conditions for use in optimizing the channel performance of future data transmissions.

It should be understood that the overall channel performance of a communication link remains relatively static even though the performance of a particular sub-carrier and/or antenna pair may change quite rapidly. This is particularly true if the communication link has sufficient bandwidth and spatial diversity. Accordingly, the size of the transmitted data packets may be fixed, leaving only the encoding parameters to be adjusted, which can occur in near real time based on received CSRs. Transmitting fixed-sized data packets greatly simplifies the MAC layer's complexity. There is, however, some added complexity required in the PHY layer, particularly if the PHY layer is configured to determine and implement the final encoding scheme.

Prior to, after, or in parallel with transmitting the formatted data packets (step 118), the transmitter may optionally generate and send a transmit format control (TFC) signal to the receiver (step 120). This TFC signal includes information regarding the transmit parameter settings and identifies which sub-carriers have been modulated by which modulation schemes (e.g., QPSK, 16 QAM, 256 QAM, etc.), and/or which coding types and data rates have been used. Providing this type of information to the receiver as part of the TFC signal is an enhancement which simplifies overall receiver decoding complexity. Alternatively, if a TFC signal is not generated or not successfully received at the receiver, the receiver may determine TFC information on its own via a trial and error method, hereinafter referred to as "blind TFC detection".

To further improve the overall system performance, the transmitter and/or receiver may monitor CSR signals emitted by other receiver(s) in the system, assess the communication link between themselves and the receiver(s) emitting the CSRs, and maintain a history of these channel conditions for use in future communications with that receiver.

Figure 2:
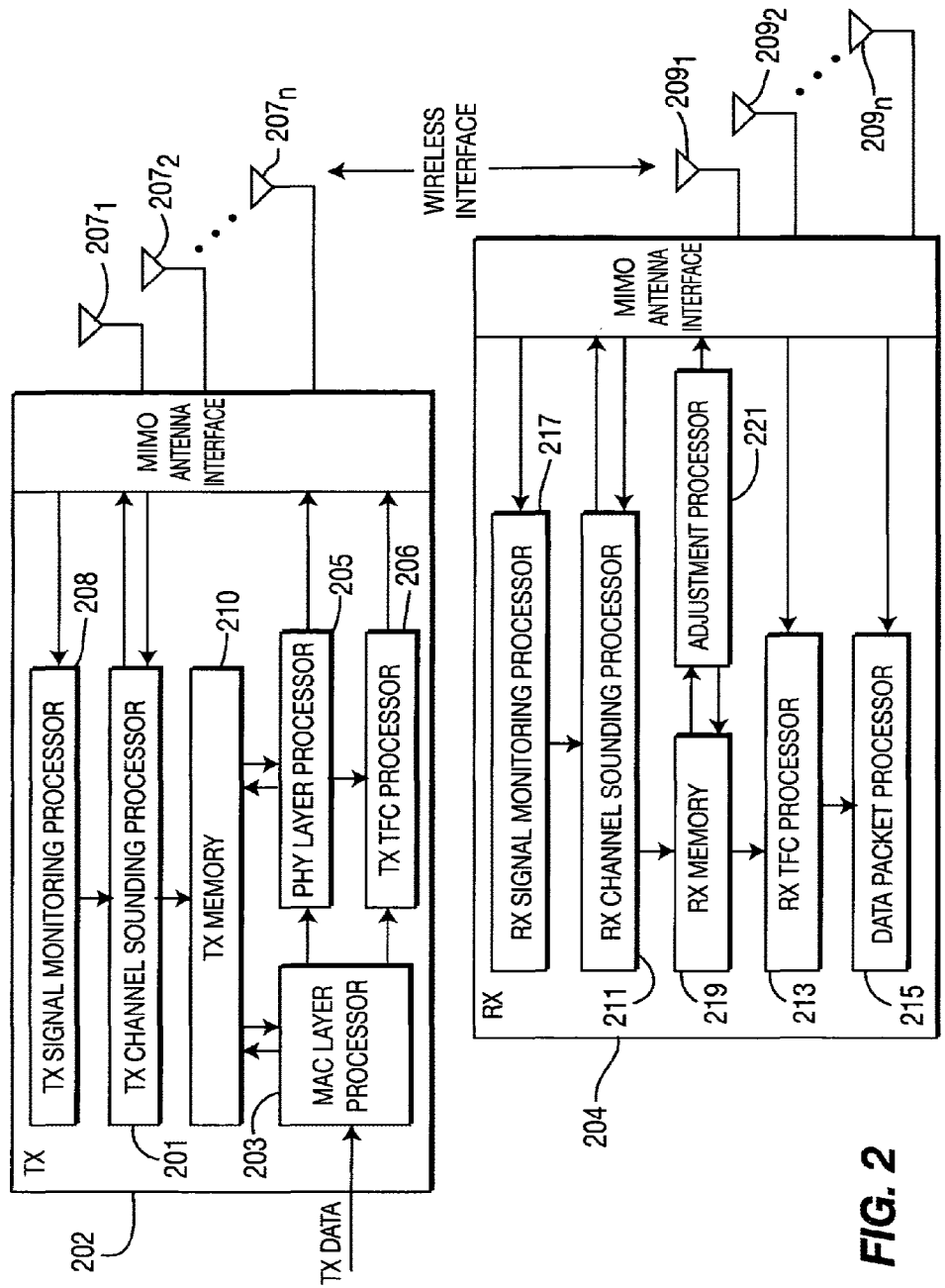
FIG. 2 is a MIMO-OFDM transmitter-receiver pair configured to use channel sounding pulses to improve system performance.

Referring now to FIG. 2, a MIMO-OFDM transmitter 202 and receiver 204 configured in accordance with the present invention are shown. Included in the transmitter 202 is a channel sounding signal processor 201 for generating low rate sounding request signals, for processing received channel sounding response signals, and preferably, for assessing channel conditions of a communication link between itself and receivers. In addition, the transmitter 202 includes a MAC layer processor 203 for setting data transmit parameters including data rates, coding schemes, packet formats, etc., a physical (PHY) layer processor 205 for spreading data bits across sub-carriers and across transmit antennas $207_1$, $207_2$, ... $207_n$ according to the MAC parameter setting processor 203 or optionally, according to the PHY layer processor's 205 own transmit parameter settings, an optional transmit format control (TFC) processor 206 for processing information from the MAC processor 203 and/or the PHY layer processor 205, an optional signal monitoring processor 208 for monitoring CSR signals transmitted between other receiver-transmitter pairs, an optional memory component 210 for maintaining a history of channel conditions and determined transmit parameters, and a plurality of transmit/receive antennas $207_1$, $207_2$, ... $207_n$.

Included in the receiver 204 is a plurality of transmit/receive antennas $209_1$, $209_2$, ... $209_n$, a channel sounding processor 211 for processing channel low rate sounding requests, for generating channel sounding response (CSR) signals, and preferably, for assessing channel conditions of a communication link between itself and other transmitters and/or receivers. In addition, the receiver 204 includes an optional TFC processor 213 for processing received TFC control information and for determining TFC information via blind detection, a data packet processor 215 for decoding and demodulating received data packets according to the information provided by the TFC processor 213, an optional signal monitoring processor 217 for monitoring CSR signals transmitted from other receivers, a memory component 219 for maintaining a history of channel conditions, and an optional adjustment processor 221 for adjusting transmit parameters based on the channel history.

Figure 3:
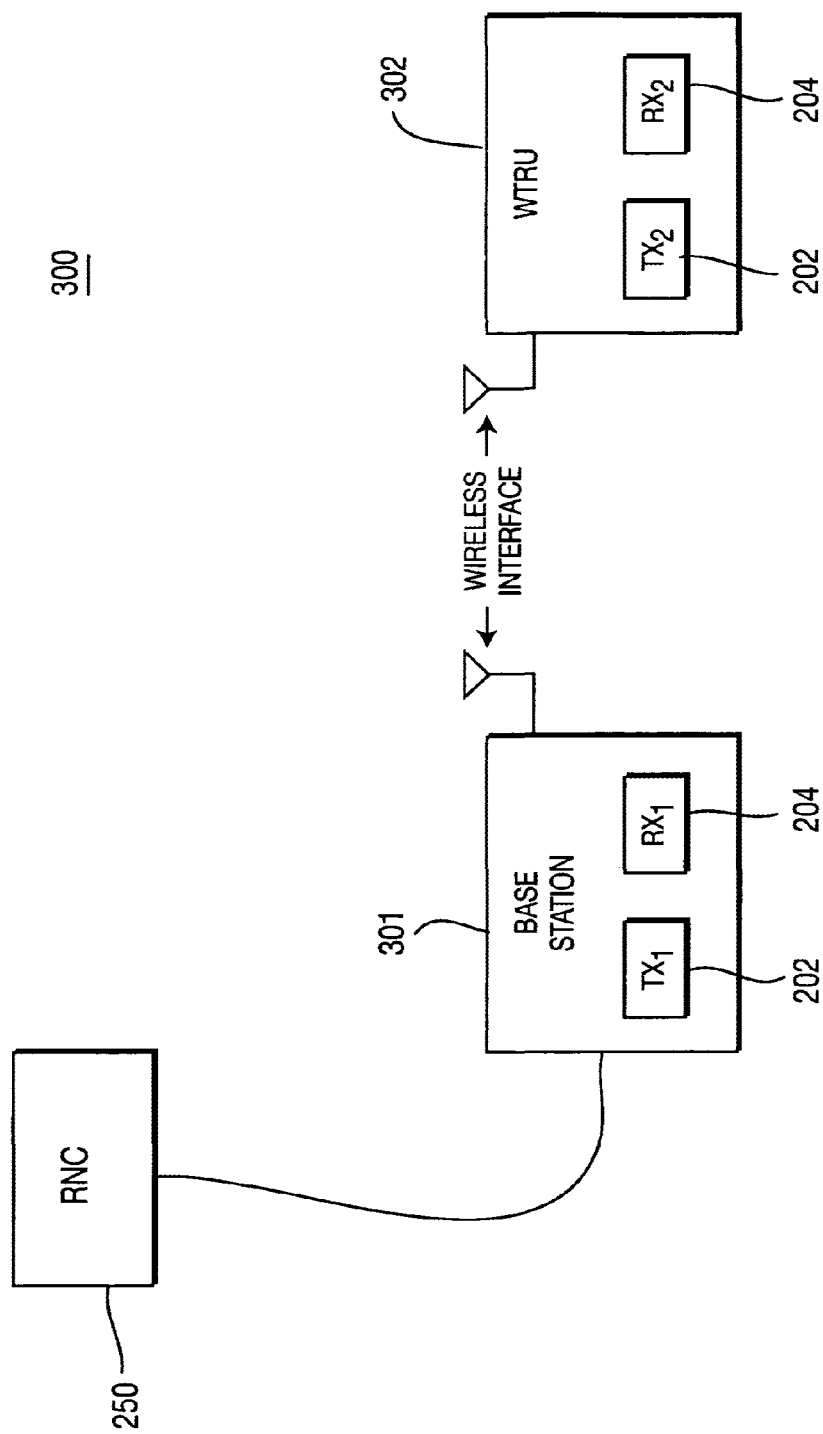
FIG. 3 is MIMO-OFDM wireless communication system wherein a base station and a wireless transmit/receive unit (WTRU) each comprise a transmitter-receiver pair in accordance with the present invention.

For clarity and solely for illustrative purposes, the transmitter 202 and the receiver 204 shown in FIG. 2 are hereinafter described as separate devices operating independently in a MIMO-OFDM system. It should be understood, however, that these devices 202, 204 are preferably configured to co-exist as inter-related components of a single MIMO-OFDM network device, such as a base station or a WTRU, as shown in FIG. 3. The MIMO-OFDM wireless communication system 300 of FIG. 3 comprises a base station 301 and WTRU 302 communicating over a wireless interface, and an RNC 250 for controlling the base station 301. As the Figure illustrates, both the base station 301 and WTRU comprise a transmitter 202—receiver 204 pair configured in accordance with the present invention.

Referring back to FIG. 2, in the transmitter 202, prior to processing a data stream Tx for transmission, a low rate channel sounding request signal is generated in the channel sounding signal processor 201. This sounding request is then passed to the transmit antennas $207_1$, $207_2$, ... $207_n$ for transmission to the receiver 204 via a wireless interface. Upon receiving the low rate request, the receiver 204 processes the request and generates a channel sounding response (CSR) in its channel sounding processor 211. As described above, the CSR is preferably a short burst formatted to assure reception at the transmitter 202 and includes information known to the transmitter 202 for use in assessing current channel conditions. Once generated, the CSR is sent to the receiver's antennas $209_1$, $209_2$, ... $209_n$ for transmission to the transmitter 202.

The CSR is then received at the transmitter 202 and processed in the transmitter's channel sounding processor 201. The channel sounding processor 201 analyzes the information transmitted as part of the CSR and uses this information to characterize current channel conditions in the uplink, and to estimate downlink channel response. These channel characterizations are then sent to the MAC layer processor 203 and/or to the PHY layer processor 205 where they are used to set data transmit parameters including: sub-carrier allocation, transmit antenna allocation, sub-carrier transmit power, transmit antenna power, sub-carrier coding, bandwidth selection, etc. Optionally, with regard to selecting a desired portion of bandwidth on which to transmit, the transmitter 202 may comprise a separate processor (not shown) configured to operate as a bandwidth selection unit. The PHY layer processor 205 then formats the transmit data packets, modulates the various sub-carriers (not shown) with user data, and maps the modulated sub-carriers to the transmit/receive antennas $207_1$, $207_2$, ... $207_n$, using a channel capacity optimization scheme, such as water-filling, a channel reliability optimization scheme, or any other channel performance optimizing scheme in accordance with the transmit parameter settings. The formatted data packets are sent to the transmit/receive antennas $207_1$, $207_2$, ... $207_n$ for transmission to the receiver 204 using preferred portions of the bandwidth. Optionally, the transmitter 202 maintains a history of channel condition estimates for use in optimally transmitting future data packets.

Prior to, after, or in parallel with transmitting the formatted data packets, the optional TFC processor 206 generates and transmits a TFC signal via the transmit/receive antennas $207_1$, $207_2$, ... $207_n$ over the wireless interface. This TFC signal indicates to the receiver 204 the transmit parameter settings of the transmitted data packets and identifies the location (i.e., on which sub-carriers the data bits are being transmitted), the coding schemes and the modulation schemes (e.g., QPSK, 16 QAM, etc.) used for the transmitted data packets.

If a TFC signal is transmitted, the receiver 204, receives the TFC signal and processes it in its optional TFC processor 213. This TFC processor 213 extracts the formatting and modulation information from the TFC signal and sends it to the data packet processor 215 for use in decoding and demodulating received data packets. Otherwise, if a TFC signal is not successfully detected by the receiver 204, the TFC processor 213 gathers available TFC information using a blind detection-type process.

To further improve system capacity and efficiency, the transmitter 202 and receiver 204 can monitor the CSRs generated by other receivers (not shown) using their respective signal monitoring processors 208, 217 and thereafter, assess and estimate the channel conditions between themselves and the other receiver(s). In the transmitter 202 and the receiver 204, their respective channel sounding processors 201, 211 may be configured to perform these channel assessments and estimates. Alternatively, the transmitter 202 and receiver 204 may each comprise additional processors (not shown) configured to function as a signal analyzer that assesses uplink channel conditions and as an estimator for estimating downlink channel conditions based on the channel assessments, respectively. This channel condition information may be utilized by both the transmitter 202 and receiver 204 to maintain a history of the channel conditions for use in determining transmit parameters of future communications with the receiver(s). This history may be stored in their respective memory components 210, 219.

In accordance with the present invention, the transmitter 202 may reuse the transmit parameter settings, preferably stored in the optional memory component 210, as set by the MAC layer processor 203 and/or the PHY layer processor 205 for subsequent data transmissions such time that a future CSR indicates a change in channel conditions. Alternatively, the transmitter 202 may use historical results from previously received CSR(s), also stored in the optional memory component 210 or in a secondary memory component (not shown), to predict when a change in channel conditions will occur and at that time, adjust the transmit parameters accordingly. Similarly, the receiver 204 may maintain a history of channel conditions in its optional memory component 219 for use in adjusting transmit parameters via its optional adjustment processor 221.

Although not particularly specified, the frequency at which a transmitter requests channel sounding information from a receiver depends on a variety of factors. Examples of such factors include, but are not limited to: system configuration, number of sub-carriers, number of spatial channels, volatility of the communication link, communication environment, and the like. In general terms, a transmitter must request a CSR often enough to maintain accurate knowledge of the channel. As an example, a transmitter may begin by requesting CSRs at predetermined time intervals. As the transmitter begins to accumulate CSR data, the transmitter may use this data to estimate the rate at which channel conditions change and accordingly request CSRs according to the change frequency.

The present invention may be implemented in any type of wireless communication system, as desired. By way of example, the present invention may be implemented in any type of 802-type system, UMTS-FDD, UMTS-TDD, TDSCDMA, CDMA2000, OFDM-MIMO or any other type of wireless communication system. The present invention may also be implemented on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s).

While the present invention has been described in terms of various embodiments, other variations, which are within the scope of the invention, as outlined in the claims below, will be apparent to those skilled in the art. Further, although the features and elements of the present invention are described in the various embodiments in particular combinations, each feature or element can be used alone (without the other features and elements of the preferred embodiments) or in various combinations with or without other features and elements of the present invention.

The invention claimed is:

1. A wireless communications method for a base station, the method comprising:
   transmitting a channel sounding response request (CSRq) in a downlink channel to a wireless transmit/receive unit (WTRU), wherein the CSRq comprises channel sounding instructions;
   receiving an uplink channel sounding response (CSR) responsive to the CSRq, the CSR being defined in terms of the number of symbols, size and symbol amplitude;
   determining a multiple-input multiple-output (MIMO) uplink channel response via measuring amplitudes and phases of subcarriers of the CSR at a plurality of antennas;
   determining, based on the MIMO uplink channel response, downlink transmit parameter settings, including modulation and coding parameters, for each of a plurality of subcarriers to be transmitted on by the base station; and
   transmitting the determined downlink transmit parameter settings to the WTRU.

2. The method of claim 1 further comprising:
   determining the plurality of sub-carriers to be transmitted on based on the MIMO uplink channel response.

3. The method of claim 1 wherein the determined transmit parameters settings are transmitted to the WTRU using a transmit format TF signal.

4. The method of claim 3 wherein the TF signal includes power control parameters.

5. The method of claim 1 wherein the size of the CSR is the number of subcarriers.

6. A base station for use in wireless communications comprising:
   a transmitter configured to transmit a channel sounding response request (CSRq) in a downlink channel to a wireless transmit/receive unit (WTRU), wherein the CSRq comprises channel sounding instructions;
   a receiver configured to receive an uplink channel sounding response (CSR) responsive to the channel sounding instructions, wherein the CSR is defined in terms of the number of symbols, size and symbol amplitude; and
   a processor configured to determine a multiple-input multiple-output (MIMO) uplink channel response via measuring amplitudes and phases of subcarriers of the CSR at a plurality of antennas and to determine, based on the MIMO uplink channel response, downlink transmit parameters settings, including modulation and coding parameters, for each of a plurality of subcarriers to be transmitted on by the base station;
   wherein the transmitter is further configured to transmit the determined downlink transmit parameter settings to the WTRU.

7. The base station of claim 6 wherein the processor is further configured to determine the plurality of sub-carriers to be transmitted on based on the MIMO uplink channel response.

8. The base station of claim 6 wherein the determined transmit parameter settings are transmitted to the WTRU using a TF signal.

9. The base station of claim 8 wherein the TF signal includes power control parameters.

10. The base station of claim 6 wherein the size of the CSR is the number of subcarriers.

11. A wireless transmit receive unit (WTRU) comprising:
    a receiver configured to receive a channel sounding response request (CSRq) on a downlink channel, the CSRq comprising channel sounding instructions; and
    a transmitter configured to transmit on an uplink channel a channel sounding response (CSR) responsive to the channel sounding instructions, wherein the CSR is defined in terms of the number of symbols, size and symbol amplitude;
    the receiver further configured to receive downlink transmit parameter settings, the downlink transmit parameters including modulation and coding parameters, for each of a plurality of sub-carriers to be transmitted on by a base station, wherein the received downlink transmit parameter settings are based on a multiple-input multiple-output (MIMO) uplink channel response that was determined via measuring subcarriers of the CSR at a plurality of antennas of the base station.

12. The WTRU of claim 11 wherein the transmit parameter settings further include the plurality of sub-carriers to be transmitted on.

13. The WTRU of claim 11 wherein the determined transmit parameters settings are received in a transmit format (TF) signal.

14. The WTRU of claim 13 wherein the TF signal includes power control parameters.

15. The WTRU of claim 11 wherein the size of the CSR is the number of subcarriers.

16. A wireless communications method for a wireless transmit receive unit (WTRU), the method comprising:
    receiving a channel sounding response request (CSRq) on a downlink channel, the CSRq comprising channel sounding instructions;
    transmitting on an uplink channel a channel sounding response (CSR) responsive to the channel sounding instructions, wherein the CSR is defined in terms of the number of symbols, size and symbol amplitude; and
    receiving downlink transmit parameter settings, including modulation and coding parameters, for each of a plurality of sub-carriers to be transmitted on by a base station, wherein the received downlink transmit parameter settings are based on a multiple-input multiple-output (MIMO) uplink channel response determined via measuring subcarriers of the CSR at a plurality of antennas of the base station.

17. The method of claim 16 wherein the transmit parameter settings further include the plurality of sub-carriers to be transmitted on.

18. The method of claim 16 wherein the determined transmit parameters settings are received in a transmit format (TF) signal.

19. The method of claim 18 wherein the TF signal includes power control parameters.

20. The method of claim 18 wherein the size of the CSR is the number of subcarriers.

* * * * *